(12) United States Patent
Znaidia et al.

(10) Patent No.: US 9,569,698 B2
(45) Date of Patent: Feb. 14, 2017

(54) METHOD OF CLASSIFYING A MULTIMODAL OBJECT

(71) Applicant: COMMISSARIAT A L'ENERGIE ATOMIQUE ET AUX ENERGIES ALTERNATIVES, Paris (FR)

(72) Inventors: Amel Znaidia, Igny (FR); Aymen Shabou, Clamart (FR); Herve Le Borgne, Paris (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/434,723

(22) PCT Filed: Oct. 7, 2013

(86) PCT No.: PCT/EP2013/070776
§ 371 (c)(1),
(2) Date: Apr. 9, 2015

(87) PCT Pub. No.: WO2014/056819
PCT Pub. Date: Apr. 17, 2014

(65) Prior Publication Data
US 2015/0294194 A1 Oct. 15, 2015

(30) Foreign Application Priority Data

Oct. 12, 2012 (FR) ..................... 12 59769

(51) Int. Cl.
*G06K 9/00* (2006.01)
*G06K 9/62* (2006.01)
*G06F 17/30* (2006.01)

(52) U.S. Cl.
CPC ....... *G06K 9/6293* (2013.01); *G06F 17/30017* (2013.01); *G06F 17/30253* (2013.01);
(Continued)

(58) Field of Classification Search
CPC .. G06K 9/6293; G06K 9/629; G06K 9/00456; G06K 2209/27; G06F 17/30253; G06F 17/30017
See application file for complete search history.

(56) References Cited

U.S. PATENT DOCUMENTS 6,298,169 B1 * 10/2001 Guenter ................. G06T 9/008
382/232
6,968,092 B1 * 11/2005 Winger ................... G06T 9/008
375/240.22

(Continued)

OTHER PUBLICATIONS

Tao Jiang, et al., "Discovering Image-Text Associations for Cross-Media Web Information Fusion", Knowledge Discovery in Databases: PKDD 2006 Lecture Notes in Computer Science; Lecture Notes in Artificial Intellig, 2006, pp. 561-568, LNCS, Springer, Berlin, DE, XP019043903.

(Continued)

*Primary Examiner* — Aaron W Carter
(74) *Attorney, Agent, or Firm* — Baker & Hostetler LLP

(57) ABSTRACT

A method of classifying a multimodal test object described according to at least one first and one second modality is provided, including offline construction by classification of a multimedia dictionary, defined by a plurality of multimedia words, based on a recoding matrix of representatives of the first modality forming a dictionary of the first modality including a plurality of words of the first modality, the recoding matrix constructed to express the frequency of each word of the second modality of a dictionary of the second modality including a plurality of words of the second modality, for each word of the first modality, classification of a multimodal test object performed online by recoding each representative of the first modality relating to the multimedia object considered on the multimedia dictionary base, followed by aggregating representatives of the first
(Continued)

modality coded in the recoding in a single vector representative of the multimodal object.

11 Claims, 4 Drawing Sheets

(52) U.S. Cl.
CPC ......... *G06K 9/00456* (2013.01); *G06K 9/629* (2013.01); *G06K 2209/27* (2013.01)

(56) References Cited

U.S. PATENT DOCUMENTS

| | | | | |
|---|---|---|---|---|
| 2004/0212625 | A1* | 10/2004 | Sekine | G06T 15/50 345/582 |
| 2006/0017741 | A1* | 1/2006 | Sekine | G06T 15/04 345/582 |
| 2010/0121566 | A1* | 5/2010 | Joshi | G01C 21/3461 701/533 |
| 2010/0310159 | A1* | 12/2010 | Ranganathan | G06K 9/4676 382/161 |
| 2011/0072012 | A1* | 3/2011 | Ah-Pine | G06F 17/30274 707/725 |
| 2014/0229307 | A1* | 8/2014 | Kallumadi | G06Q 30/0601 705/26.1 |
| 2015/0086118 | A1* | 3/2015 | Shabou | G06K 9/6249 382/195 |

OTHER PUBLICATIONS

Jinjun Wang, et al., "Locality-Constrained Linear Coding for Image Classification", 2010 IEEE Conference on Computer Vision and Pattern Recognition, Jun. 13-18, 2010, pp. 3360-3367, IEEE, Piscataway, NJ, USA, XP031725847.

Amel Znaidia, et al., "Multimodal Feature Generation Framework for Semantic Image Classification", Proceedings of the 2nd ACM International Conference on Multimedia Retrieval, Jun. 5, 2012, pp. 1-8, XP055090802.

Amel Znaidia, et al., "CEA LIST's Participation to the Concept Annotation Task of Image CLEF 2012", CLEF (Oneline Working Notes/labs/workshop), Sep. 17, 2012, pp. 1-8, XP055090806.

Amel Znaidia, et al., "Bag-of-Multimedia-Words for Image Classification", 2012 21st International Conference on Pattern Recognition, Nov. 11, 2012, pp. 1509-1512, IEEE, XP032329618.

Amel Znaidia, et al., "Tag Completion Based on Belief Theory and Neighbor Voting", Proceedings of the 3rd ACM Conference on International Conference on Multimedia Retrieval, Apr. 16, 2013, pp. 1-8, XP055090807.

Ron Bekkerman, et al., "Multi-Modal Clustering for Multimedia Collections", IEEE Conference on Computer Vision and Pattern Recognition, Jun. 18-23, 2007, pp. 1-8, IEEE, Piscataway, NJ, XP031114480.

Nikhil Rasiwasia, et al, "A New Approach to Cross-Modal Multimedia Retrieval", Proceedings of the International Conference on Multimedia, 2010, pp. 251-260, XP055065584.

Svetlana Lazebnik, et al, "Beyond Bags of Features: Spatial Pyramid Matching for Recognizing Natural Scene Categories", IEEE Conference on Computer vision and Pattern Recognition, Jun. 2006, pp. 2169-2178.

Josef Sivic, et al., "Video Google: A Text Retrieval Approach to Object Matching in Videos", Proceedings of the Ninth IEEE International Conference on Computer Vision, 2003, pp. 1-8.

J.C. van Germert, et al., "Visual Word Ambiguity", IEEE Transaction on Pattern Analysis and Machine Intelligence, pp. 1-13. 2008.

Shenghua Gao, et al., "Local Features are Not Lonely—Laplacian Sparse Coding for Image Classification", CVPR, 2011, pp. 1-7.

Lingqiao Liu, et al., "In Defense of Soft-Assignment Coding", CVPR 2011, pp. 1-8.

Jianchao Yang, et al., "Linear Spatial Pyramid Matching Using Sparse Coding for Image Classification", CVPR, 2009, pp. 1-8.

Yongzhen Huang, et al., "Salient Coding for Images Classification", CVPR, 2011, pp. 1753-1760.

* cited by examiner

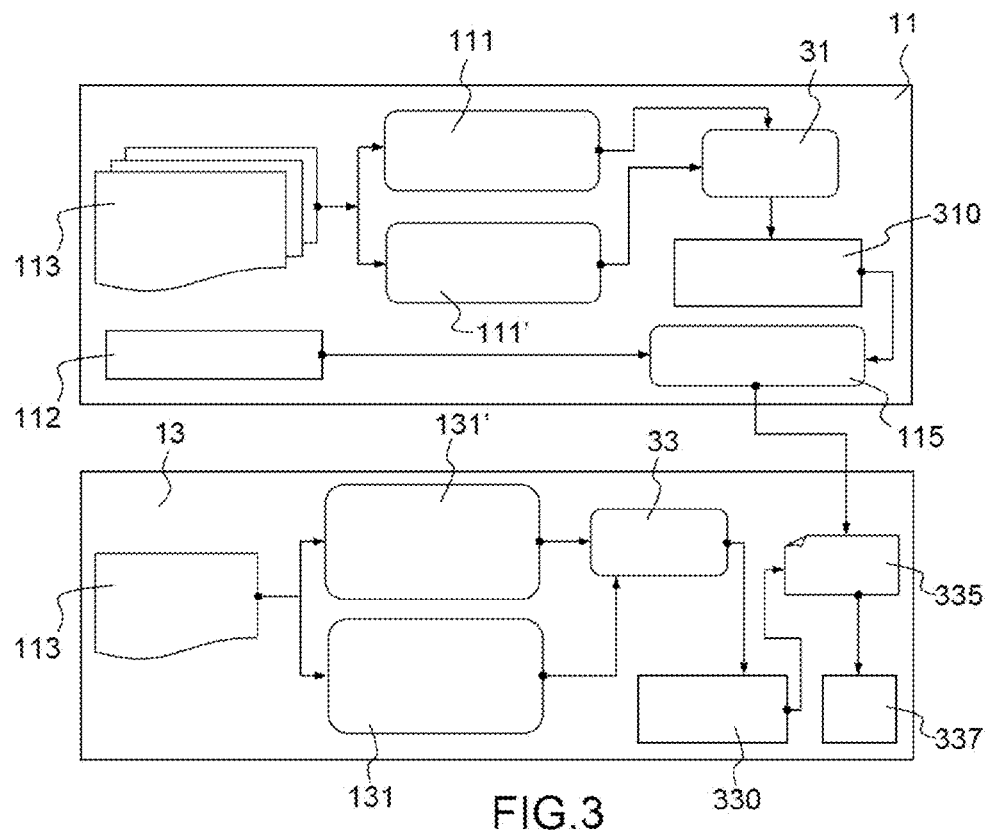
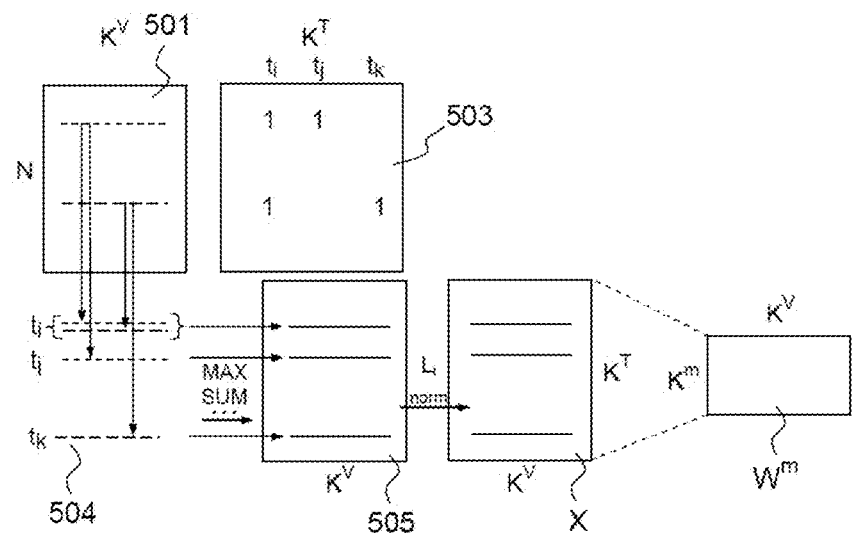
FIG.3
FIG.5

METHOD OF CLASSIFYING A MULTIMODAL OBJECT

CROSS-REFERENCE TO RELATED APPLICATIONS

This application is a National Stage of International patent application PCT/EP2013/070776, filed on Oct. 7, 2013, which claims priority to foreign French patent application No. FR 1259769, filed on Oct. 12, 2012, the disclosures of which are incorporated by reference in their entirety.

FIELD OF THE INVENTION

The present invention relates to a method of classifying a multimodal object. The present invention lies within the field of the detection and automatic recognition of multimodal objects referred to as 'multimedia', i.e. described according to at least two modalities, e.g. objects formed by an image and a set of textual words associated with this image. More precisely, the present invention falls into the field known as supervised classification. It is applicable notably to the classification and searching of multimedia information in databases.

BACKGROUND

A 'multimedia' document or object essentially comprises a plurality of modalities. For example, a multimedia object may consist of an image accompanied by textual information, which may be designated as 'tags'. A multimedia object may also consist of a web page comprising one or more images and textual content. A multimedia object may also consist, e.g. of a scanned document divided into a plurality of channels, e.g. one channel including textual information from an optical character recognition process, commonly referred to by the initials OCR, one channel including illustrations and photographs identified in the document. A multimedia object may also consist, e.g. of a video sequence separated into a plurality of channels, e.g. a visual channel including the images of the video sequence, a sound channel including the soundtrack of the sequence, a textual channel including e.g. subtitles, or textual information originating from a process of transcription of speech into text, a channel including metadata relating to the video sequence, e.g. relating to the date, author, title, format of the sequence, etc.

It is understood that the present invention applies to any type of multimedia object, and is not necessarily limited to the aforementioned types of multimedia objects.

In practice, it may be desirable to be able to establish a description of multimedia objects, e.g. for classification or multimedia object search applications in one or more databases, by means of queries in the form of multimedia documents in the form sought, or limited to one of the modalities of the multimedia object sought; e.g. in the case where the multimedia object sought is an image associated with textual tags, a query may include only visual information, or only textual information. The search then consists in finding the multimedia documents in the database best matching the query, e.g. for then presenting them in order of relevance.

The description of a multimedia document is tricky, due to the heterogeneous nature of the modalities defining same. For example, as part of the classification of images associated with textual content, the visual modality may be transformed into feature vectors forming a low level visual description; the textual mode itself may be mapped in a dictionary reflecting a language or a particular subdomain thereof. For the purposes of classifying a visual document or a textual document, use may be made of known supervised classification techniques described below with reference to FIG. 1, more particularly 'bags of words' classification techniques. According to one supervised classification technique, features are extracted from a plurality of objects, for the purpose of feeding a learning system, together with labels, for producing a model, this processing being carried out offline. In a 'test' phase, a 'test' object also undergoes features extraction in a similar way, the extracted features being compared with the model produced offline for enabling a prediction, the aforementioned steps being performed online.

In order to remedy the problem related to the heterogeneity of modalities, it is possible, according to a first technique known as late fusion, to proceed to the description and classification of multimedia objects separately for the different modalities according to which the latter is defined, then belatedly merge the results obtained for the different modalities. The late fusion technique is described in detail below with reference to FIG. 2.

According to an alternative method, known as early fusion, the modalities are merged at the feature extraction level. The early fusion technique is described in detail below with reference to FIG. 3.

SUMMARY OF THE INVENTION

One object of the present invention is to provide a more compact method for describing multimedia objects than the known methods, at the same time combining different modalities of multimedia objects for better describing the content thereof, the method being capable of operating independently of the content of the objects itself.

According to the present invention, it is provided that signatures are identified for multimedia objects, these signatures resulting from a combination of information according to different modalities. The present invention is thus based on an early fusion technique, and is based first on multimedia codes enabling the coding of words according to a first modality, e.g. textual, on words according to a second modality, e.g. visual, extracted from a multimedia object, and secondly on the determination of 'bag of multimedia words' type signatures, following the example of bags of words techniques used for monomodal objects, explained below.

For this purpose, the subject matter of the invention is a method of classifying a multimodal test object termed a multimedia test object described according to at least one first and one second modality, characterized in that it includes a step of offline construction by unsupervised classification of a multimedia dictionary, defined by a plurality $K^m$ of multimedia words, on the basis of a recoding matrix of representatives of the first modality forming a dictionary of the first modality including a plurality $K^T$ of words of the first modality, the recoding matrix being constructed so that each of the components thereof forms information representative of the frequency of each word of the second modality of a dictionary of the second modality including a plurality $K^V$ of words of the second modality, for each word of the first modality, the classification of a multimedia test object being performed online by means of a step of recoding each representative of the first modality relating to the multimedia object considered on the multimedia dictionary base, followed by a step of aggregating the representatives of the first modality coded in the recoding step in a single vector representative of the multimedia object considered.

According to a particular aspect of the invention, said recoding matrix is constructed at least using the following steps:

Constructing a word occurrence matrix for the second modality on a plurality of N images, Constructing an intermediate matrix including $K^T$ columns, each column corresponding to a word of the first modality, said intermediate matrix containing, for each image in the plurality N, information representative of the presence or absence of each word of the second modality, Constructing, from the occurrence matrix and the intermediate matrix, the recoding matrix (X) which contains for each word of the first modality and each word of the second modality, an aggregation on the plurality of N images of the occurrence of the word of the second modality for the word of the first modality.

In one embodiment of the invention, said first modality may be textual, and said second modality may be visual, the test object being a test image associated with textual tags, said dictionary according to the first modality being a textual dictionary and said dictionary according to the second modality being a visual dictionary.

In one embodiment of the invention, the method of classification may include a sequence of at least the following steps, performed offline:

a step of extracting the visual features of a plurality N of images forming a learning base, during which the local features of each image are extracted and coded on the visual dictionary;

a step of constructing the recoding matrix;

a step of normalizing the recoding matrix;

an unsupervised classification step, referred to as a step of clustering the normalized recoding matrix, generating the multimedia dictionary.

In one embodiment of the invention, the method of classification may include a sequence of at least the following steps, performed online:

said step of recoding each textual tag of the test image on the multimedia dictionary, generating a recoded matrix;

said aggregation step, aggregating the recoded matrix and generating a multimedia signature for the test image.

In one embodiment of the invention, the recoding step may be based on a technique of locally constrained linear coding.

In one embodiment of the invention, said normalization step may include a row-wise normalization of the recoding matrix according to the L1 -norm.

In one embodiment of the invention, said step of clustering may be performed based on a K-means algorithm.

The subject matter of the present invention is also a device for classifying a test object including means suitable for implementing a method of classification according to one of the embodiments described.

The subject matter of the present invention is also a computer program comprising instructions for implementing a method of classification according to one of the embodiments described.

One advantage provided by the present invention is that a method according to one of the embodiments described only requires learning a single multimedia model.

Another advantage of the present invention is that a method according to one of the embodiments described results in signatures of reduced size with respect to signatures involved in methods according to which the modalities are processed separately, with identical performances obtained.

Thus, a method according to one of the embodiments described enables faster processing times, with equal desired performances, compared with known methods.

BRIEF DESCRIPTION OF THE DRAWINGS

Other features and advantages of the invention will become apparent on reading the description, given by way of example, with reference to the accompanying drawings in which:

FIG. 3 is a diagram illustrating a technique of supervised classification of multimodal documents, according to an early fusion method;

FIG. 5 is a diagram illustrating the principle of constructing a recoding matrix and a multimedia dictionary, in a method as illustrated in FIG. 4;

DETAILED DESCRIPTION

Figure 1:
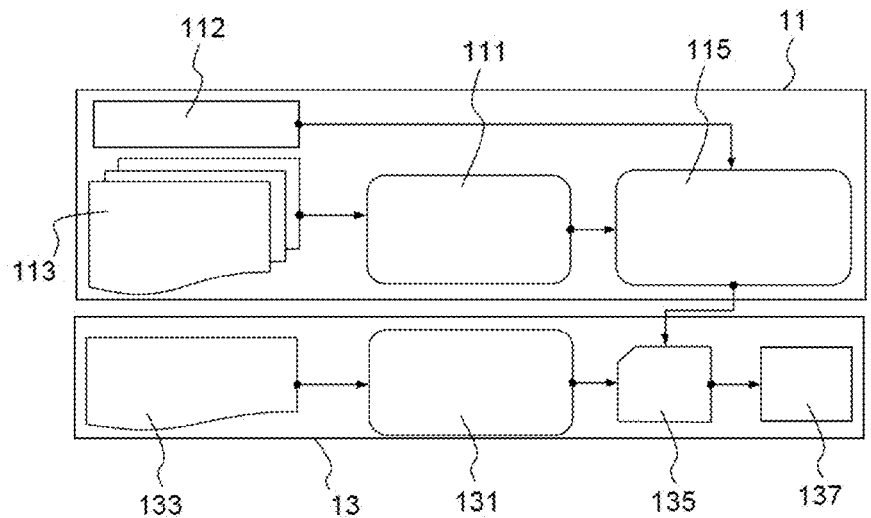
FIG. 1 is a diagram illustrating a technique of supervised classification of images.

FIG. 1 is a diagram illustrating the supervised classification technique, previously introduced. It should be noted that the example illustrated in FIG. 1 applies to the classification of all types of objects, e.g. visual objects such as images, or textual objects.

A supervised classification method notably includes a learning phase 11 performed offline, and a test phase 13 performed online.

The learning phase 11 and the test phase 13 each include a feature extraction step 111, 131 for describing an object, e.g. an image, via a vector of determined dimension. The learning step 11 consists in extracting the features on a large number of learning objects 113; a series of signatures and corresponding labels 112 supply a learning module 115, implementing a learning step and then producing a model 135.

The test step 13 consists in describing, by means of the feature extraction step 131, an object called a test object 133 via a vector of the same nature as during the learning phase 11. This vector is applied to the input of the aforementioned model 135. The model 135 produces at the output thereof a prediction 137 of the test object 133 label. The prediction associates the most relevant label (or labels) with the test object from among the set of possible labels.

This relevance is calculated by means of a decision function associated with the learning model learned on the learning base depending on the learning algorithm used.

The label of an object indicates its degree of belonging to each of the concepts considered. For example, if three classes are considered, e.g. the classes 'beach', 'town' and 'mountain', the label is a three-dimensional vector, of which each component is a real number. For example, each component can be a real number between 0 if the object does not contain the concept, and 1 if the image contains the concept with certainty.

The learning technique may be based on a technique known in itself, such as the technique of wide margin separators, commonly referred to by the initials SVM for 'Support Vector Machine', on a technique known as 'boosting', or on a technique of the type referred to by the initials MKL for 'Multiple Kernel Learning'.

Figure 2:
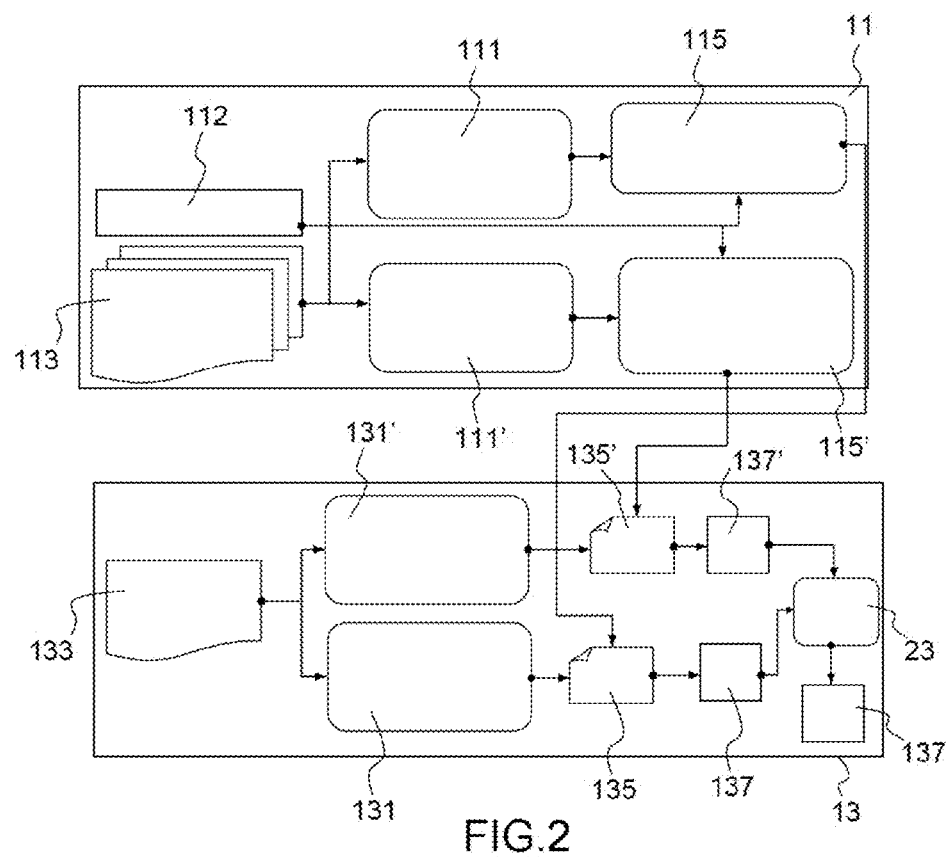
FIG. 2 is a diagram illustrating a technique of supervised classification of multimodal documents, according to a late fusion method.

FIG. 2 is a diagram illustrating a technique of supervised classification of multimodal documents, according to a late fusion method.

In a similar way to FIG. 1 described above, a system of supervised classification of multimedia objects notably includes a learning phase 11 performed offline, and a test phase 13 performed online.

The learning phase 11 and the test phase 13 each include two feature extraction steps 111, 111' and 131, 131' for describing a multimedia object, bimodal in the example illustrated in the figure, e.g. an image associated with textual content. Thus the learning phase 11 includes a feature extraction step 111 according to a first modality, e.g. visual, and a feature extraction step 111' according to a second modality, e.g. textual. The learning step 11 consists in extracting the features on a large number of learning objects 113; a series of signatures and corresponding labels 112 supply a first learning module 115 relating to the first modality, and a second learning module 115' relating to the second modality, the two learning modules 115, 115' implementing a learning step and then producing respectively a first model 135 according to the first modality, and a second model 135' according to the second modality.

In a manner also similar to FIG. 1 described previously, the test step 13 consists in describing, by means of two feature extraction steps 131, 131', according to the first and the second modality respectively, an object called a test object 133 via vectors of the same nature, respectively according to the first and the second modality, as during the learning phase 11. These two vectors are applied at the input of the two aforementioned models 135, 135' respectively. Each model 135, 135' produces at the output thereof a first prediction 137 relating to the first modality and a second prediction 137' relating to the second modality respectively, of the test object 133 labels. The labels according to the two modalities are then merged in a fusion step 23, producing a single multimodal label. The fusion step 23 is thus applied only online. The prediction associates the most relevant label (or labels) with the test object from among a set of possible labels.

The example described above applies to bimodal objects, but a supervised classification system may similarly be applied to multimedia objects according to a plurality of modalities, greater than two, with as many feature extraction and learning steps then being implemented.

FIG. 3 is a diagram illustrating a technique of supervised classification of multimodal documents, according to an early fusion method.

In a similar way to FIGS. 1 and 2 described above, a system of supervised classification of multimedia objects notably includes a learning phase 11 performed offline, and a test phase 13 performed online.

Following the example of FIG. 2 described above, the learning phase 11 and the test phase 13 each include two feature extraction steps 111, 111' and 131, 131' for describing a multimedia object, bimodal in the example illustrated in the figure, e.g. an image associated with textual content. Thus the learning phase 11 includes a feature extraction step 111 according to a first modality, e.g. visual, and a feature extraction step 111' according to a second modality, e.g. textual.

Unlike the late fusion method described with reference to FIG. 2, an early fusion step 31 can be used to generate multimedia features 310 from the extracted features according to the first and the second modality in the feature extraction steps 111, 111'. A learning module 115 implementing a learning step can be used to generate a multimedia model 335 from the multimedia features 310 generated during the early fusion step 31 and a plurality of labels 112.

In a similar manner, an early fusion step 33, operating in an identical way to the early fusion step 31 applied during the learning phase 11, can be used to generate multimedia features 330 online, from the features extracted according to the first and the second modality in the feature extraction steps 111, 111' on the basis of a test object 133.

The multimedia model 335 produces at the output thereof a prediction 337 of the test object 133 label. The prediction associates the most relevant label (or labels) with the test object from among the set of possible labels.

A classification method according to the present invention is based on the early fusion principle illustrated above. A classification method according to the present invention notably applies to feature extraction steps.

Known feature extraction steps applicable to images are briefly described below, in order to facilitate the readability of the present description, by introducing the main concepts useful for this purpose. Such extraction techniques involve a step of extracting local descriptors from an image, for reconstructing a final signature, via a 'bag of visual words' approach commonly referred to by the initials BOV corresponding to 'Bag Of Visual terms' or 'Bag Of Visterms'. Typically, one or a plurality of local descriptors are extracted from the image considered, from pixels or dense patches in the image, or more generally sites in the image. In other words, local descriptors are associated with as many patches, which may notably be defined by their localization or locality, e.g. by coordinates (x, y) in a Cartesian coordinate system in which the domain of the image considered is also defined, a patch being able to be limited to one pixel, or consist of a block of a plurality of pixels. The local descriptors are then recoded during a step of 'coding' in a 'feature space', according to a reference dictionary, commonly referred to by the term 'codebook'. The recoded vectors are then aggregated, during a step of aggregating or 'pooling' in a single signature forming vector. These steps may be repeated for several portions of the image considered, then the concatenated signatures, e.g. according to a spatial pyramid scheme, known under the initials SPM for 'Spatial Pyramid Matching', consisting in dividing the image considered into sub-blocks, e.g. squares of 2×2 or 4×4 blocks, or rectangles of 1×3 blocks, etc., determining the signature for each sub-block then concatenating all the signatures determined by weighting them by a factor depending on the scale of the divisions into sub-blocks. An SPM type technique is, for example, described in the publication by S. Lazebnik, C. Schmid and J. Ponce, 'Beyond bags of features: Spatial pyramid matching for recognizing natural scene categories' in CVPR, 2006.

Various known techniques form the basis of the aforementioned steps of aggregation and coding. The coding step may notably be based on a technique known as 'Hard Coding' or under the corresponding initials HC. Hard coding techniques are, for example, described in the publication by S. Lazebnik, C. Schmid and J. Ponce, 'Beyond bags of features: Spatial pyramid matching for recognizing natural scene categories' mentioned above, or in the publication by J. Sivic and A. Zisserman 'Video google: a text retrieval approach to object matching in videos' in ICCV, 2003. According to a hard coding technique, a local descriptor is recoded in a vector comprising a single '1' on the dimension corresponding to the index of its nearest neighbor in the codebook, and a plurality of '0's elsewhere. Associated with an aggregation step based on the determination of an average, a coding step by hard coding thus leads to the creation of a histogram of occurrence of visual words most present in the codebook, a visual word in the codebook being considered as present when it is the nearest to a local descriptor of the image considered.

The coding step may also be based on a technique known as 'Soft Coding' or under the corresponding initials SC. A soft coding technique is notably described in the publication by J. Van Gemert, C. Veenman, A. Smeulders and J. Geusebroek 'Visual word ambiguity'—PAMI, 2009. According to the soft coding technique, a local descriptor is recoded according to its similarity to each of the visual words of the codebook. The similarity is, for example, calculated as a decreasing function of the distance, typically an inverse exponential function of distance.

The coding step may also be based on a technique commonly known as 'Locally constrained Linear Coding' or under the corresponding initials LLC. LLC type techniques are notably described in the publication by S. Gao, I. Tsang, L. Chia and P. Zhao, 'Local features are not lonely—Laplacian sparse coding for image classification' in CVPR, 2011, in the publication by L. Liu, L. Wang and X. Liu, 'In defense of soft-assignment coding' in CVPR, 2011, or in the publication by J. Yang, K. Yu, Y. Gong and T. Huang 'Linear spatial pyramid matching using sparse coding for image classification' in CVPR, 2009. The principle of this technique consists in restricting soft coding to the nearest neighbors of descriptors in the feature space, e.g. 5 to 20 nearest neighbors of the codebook. In this way, coding noise can be significantly reduced.

The coding step may also be based on a technique commonly known as 'Locally constrained Salient Coding' where each descriptor is only coded on its nearest neighbor by associating a response therewith, known as 'saliency' relevance, which depends on the relative distances of the nearest neighbors to the descriptor. In other words, the shorter the distance of the nearest neighbor to the descriptor with respect to the distances of other near neighbors to this same descriptor, the greater is the relevance. A 'saliency coding' type of technique is notably described in the publication by Y. Huang, K. Huang, Y. Yu, and T. Tan. 'Salient coding for image classification', in CVPR, 2011.

Figure 4:
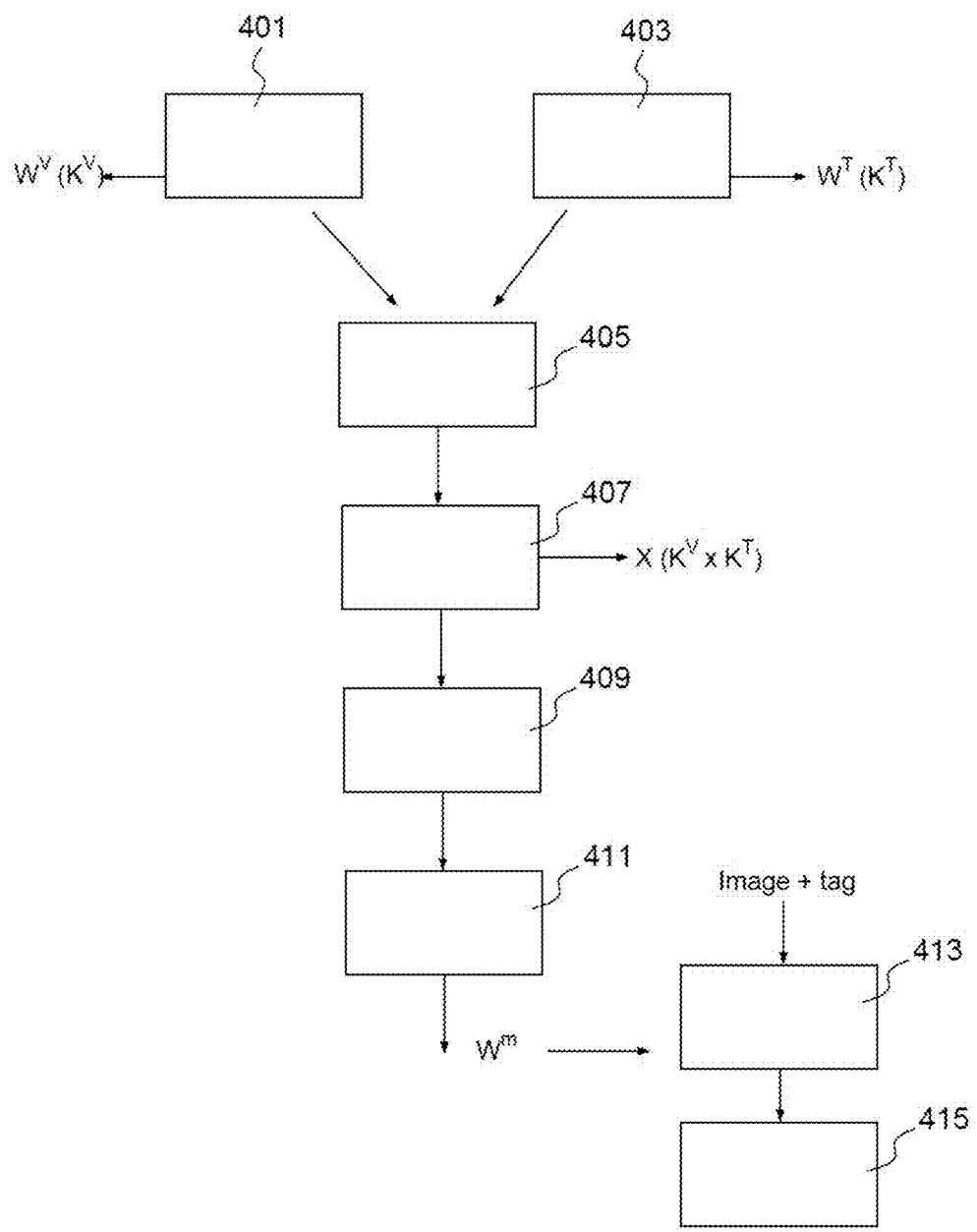
FIG. 4 is a flowchart illustrating a method of classifying a multimedia object according to an example of embodiment of the present invention.

FIG. 4 is a flowchart illustrating a method of classifying a multimedia object according to an example of embodiment of the present invention.

The example of embodiment described below with reference to FIG. 4 applies to the description and classification of image type multimedia objects associated with textual content, e.g. textual tags. It should be noted that this is a non-restrictive example of the present invention, and that modalities other than visual or textual modalities may be envisaged and treated in a similar way. In addition, the example described hereafter applies to bimodal objects, but a higher number of modalities may be envisaged.

The classification method may include a first preliminary step 401, for calculating the local visual features on a learning base, and by deducing therefrom a visual dictionary $W^v$ of size $K^v$, e.g. via an unsupervised classification method, referred to by the term 'clustering', e.g. according to the K-means algorithm, for partitioning local descriptors into a plurality k of sets in order to minimize the reconstruction error of the descriptors through the centroid inside each partition. It is also possible to use other methods of codebook learning, such as, for example, the random drawing of local descriptors or sparse coding.

The classification method may also include a second preliminary step 403, which may, for example, be performed before, after, or in parallel with the first preliminary step 401, for constructing a textual dictionary $W^T$ by selecting representative textual tags of a learning corpus, or via an ad-hoc determined dictionary, the textual dictionary $W^T$ being of a size $K^T$.

Thus each multimedia object, i.e. each image matching text content in the example described, is represented by a plurality of textual tags capable of being subsequently coded by one of $K^T$ possible textual tags forming the textual dictionary $W^T$ and a plurality of visual words, capable of being subsequently coded by one of $K^v$ possible visual words forming the visual dictionary $W^v$.

The classification method may then include an extraction step 405 of the local features of the image, during which the local image features are extracted and coded on the visual dictionary $W^v$, then aggregated according to a pooling technique. The coding may, for example, be hard coding and consist in determining the occurrence of the visual words of the visual dictionary $W^v$ closest to the local features of the image, followed, for example, by a mean type of aggregation.

The aforementioned extraction step 405 may be followed by a step of constructing 407 a recoding matrix of textual tags with $K^v$ rows and $K^T$ columns, denoted by X, the coefficients of which are denoted by X(i,j), i being an integer between 1 and $K^v$ and j being an integer between 1 and $K^T$, the recoding matrix X expressing the frequency of each visual word in the visual dictionary $W^v$ for each textual tag in the textual dictionary $W^T$. The construction step 407 may, for example, start with a zero recoding matrix X, then increment the coefficient X(i,j) by 1 each time that a learning image associated with the textual tag i has a local visual feature close to the visual word j.

The step of constructing 407 the recoding matrix X may be followed by a step of normalizing 409 the recoding matrix X, e.g. row-wise according to the L1-norm.

The step of normalizing 409 the recoding matrix X may then be followed by a step of clustering 411 on the columns of the recoding matrix X, e.g. according to a K-means algorithm or another of the clustering algorithms previously mentioned. At the conclusion of the normalization step 409, a multimedia dictionary $W^m$ may be obtained, the size of which is $K^m$. The multimedia dictionary $W^m$ then forms a new representation space for multimedia objects, the rows of the multimedia dictionary $W^m$ thus constituting multimedia words.

Each textual tag represented by a column of the recoding matrix X may then be recoded on this new representation space, during a recoding step 413. Several coding methods may be applied. The coding may notably be based on one of the aforementioned techniques, i.e. on a 'hard coding' technique, a 'soft coding' technique, a 'locally constrained linear coding' technique or a 'locally constrained salient coding' technique.

Other known coding techniques may also be envisaged. For example, if the coding is performed by means of an aforementioned 'Locally constrained Linear Coding' technique, then a textual tag code $x_i$, i.e. a column of the recoding matrix X of a given image, is the descriptor that must be coded on the multimedia dictionary $W^m$ according to the relationship (1) below:

$$z_{i,j} = \begin{cases} \frac{\exp(-\beta\|x_i - m_j\|_2^2)}{\sum_{r=1}^{k} \exp(-\beta\|x_i - m_r\|_2^2)} & \text{if } m_j \in N_k(x_i). \\ 0 & \text{else} \end{cases} \quad (1)$$

In the relationship (1) above, $x_i$ denotes a column of the recoding matrix X corresponding to the textual tag considered; $z_{i,j}$ a vector of size $K^m$, is the recoding code $x_i$ on the multimedia dictionary; $N_k(x_i)$ denotes the set of k nearest neighbors of the vector xi from among the columns of the recoding matrix X (k may, for example, be chosen equal to 5); $\beta$ denotes a control parameter: the larger this is, the less the farthest multimedia words will influence the coding; $m_j$ and $m_r$ are the multimedia words previously obtained.

Thus, for a given image, all the textual tags of this image are recoded during the recoding step 413 described above.

The recoding step 413 may finally be followed by an aggregation or 'pooling' step 415, aggregating the textual tags recoded in a single vector representing the image. The aggregation step may be based on a sum, an average, or consider the maximum of each dimension, i.e. the maximum per multimedia word, the latter method commonly being referred to as 'maximum pooling'.

FIG. 5 is a diagram illustrating the principle of constructing a recoding matrix X and a multimedia dictionary $W^m$, implemented during the construction step 407 in a method as illustrated in FIG. 4.

A visual word occurrence matrix 501 may be learned on a learning base including a plurality of N images. The visual word occurrence matrix 501 thus includes N rows and $K^V$ columns. Each row of the visual word occurrence matrix 501 includes the respective visual signatures of the N images.

A first intermediate matrix 503 denoted by V may be constructed, including $K^T$ columns, each column corresponding to a textual tag. The intermediate matrix 503 may be constructed from a zero matrix, then in a determined column of the intermediate matrix 503, for each image among the plurality N, the presence or absence of each textual tag is noted, the presence of a textual tag in an image then introducing the value '1' in the column corresponding to this textual tag. In the example illustrated in FIG. 5, an image $I_m$ is associated with the textual tags $t_i$ and $t_j$ and an image $I_n$ is associated with textual tags $t_i$ and $t_k$.

For each textual tag, the visual words for which the textual tag considered is present may then be collected, i.e. the visual words associated with the value 1 in the column of the first intermediate matrix 503 corresponding to the textual tag considered, this action being able to form a method step and being represented by a block 504 in FIG. 5.

A second intermediate matrix 505 may then be constructed, this matrix including $K^V$ columns and $K^T$ rows. For each row, i.e. for each textual tag of the textual dictionary $W^T$, an aggregation is made of the visual word occurrence corresponding thereto collected in the previous step. For example, visual word occurrences for which a given textual tag is present may be summed, an average or a maximum may also be adopted.

The coefficients composing the second intermediate matrix 505 may be formulated according to the following relationship (2):

$$X_{Int}(i, j) = \underset{d_k \in D, t_j \in T_{d_k}}{OP} [V(i, k)]; \quad (2)$$

OP denoting an aggregation operator, $d_k$ denotes the k-th document in the learning base D, $t_j$ a textual tag in the set of textual tags $T_{dk}$ relating to the document $d_k$, and V(i,k) denotes the occurrence of the i-th visual word in the document $d_k$.

For example, if the aggregation operator is a sum, the coefficients composing the second intermediate matrix 505 may be formulated according to the following relationship (3):

$$X_{Int}(i, j) = \sum_{d_k \in D, t_j \in T_{d_k}} V(i, k); \quad (3)$$

in which D denotes the learning base including N images, $d_k$ denotes the k-th document in the learning base D, $t_j$ a textual tag in the set of textual tags $T_{dk}$ relating to the document $d_k$, and V(i,k) denotes the occurrence of the i-th visual word in the document $d_k$.

The recoding matrix X may then be obtained from a normalization, e.g. row-wise according to the L1-norm, of the second intermediate matrix 505.

As described previously, the multimedia dictionary $W^m$ may then be obtained from a clustering on the columns of the recoding matrix X, e.g. according to a K-means algorithm or another of the clustering algorithms previously mentioned.

Figure 6:
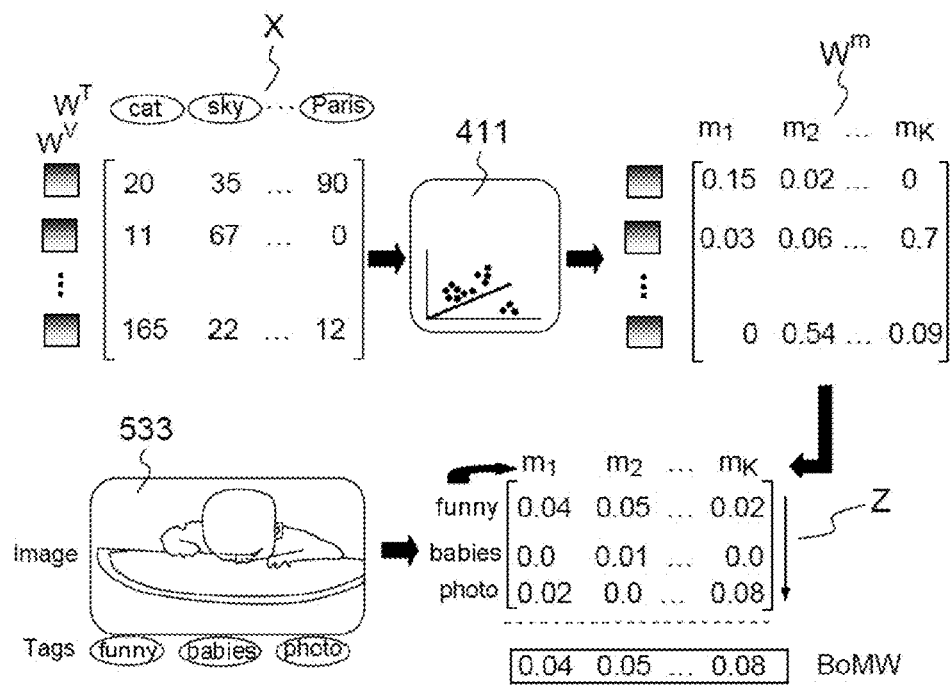
FIG. 6 is a diagram illustrating the main input and output data in a method as illustrated in FIG. 4.

FIG. 6 is a diagram illustrating the main input and output data in a classification method according to the flowchart depicted in FIG. 4, as described above.

FIG. 6 illustrates an example of recoding matrix X, the columns of which correspond to as many textual tags of the textual dictionary $W^T$, and as many visual words of the visual dictionary $W^v$. The recoding matrix X enables the construction of the multimedia dictionary $W^m$, via a clustering step 411 as described previously with reference to FIG. 4.

Each textual tag of a test image 533 may then be recoded on the multimedia dictionary $W^m$, during the recoding step 413 described previously with reference to FIG. 4.

A recoded matrix Z may thus be obtained. The recoded matrix includes as many rows as there are textual tags associated with the test image 533, and as many columns as there are multimedia words in the multimedia dictionary $W^m$.

An aggregation step 415 as described previously with reference to FIG. 4 may then be applied to the recoded matrix Z, for obtaining a Bag of Multimedia Words type of signature denoted by the initials BoMW, this signature being of reduced size, and forming a single vector representative of the test image 533.

Figure 7:
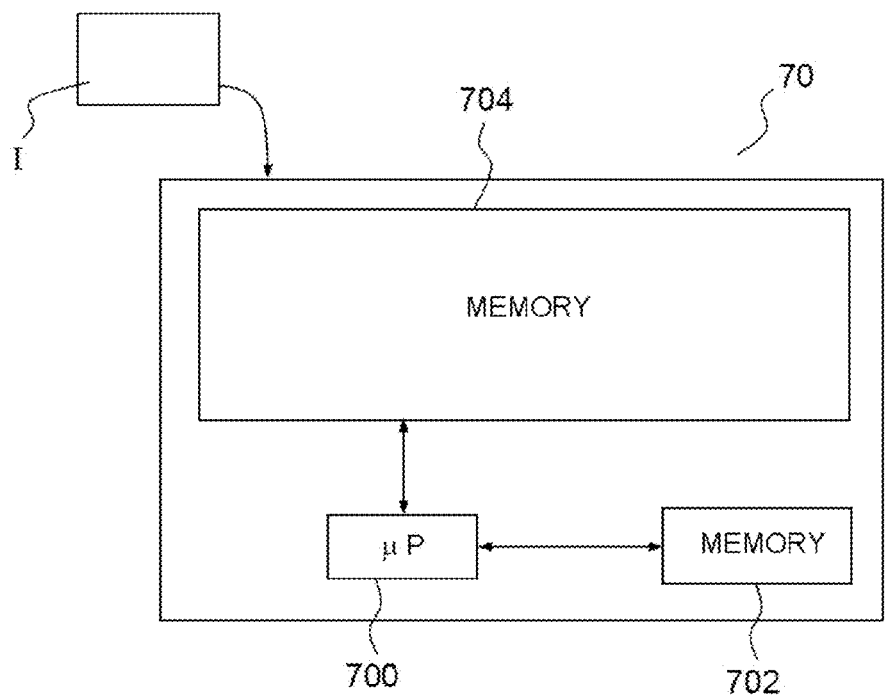
FIG. 7 is a diagram synoptically illustrating a device for recognizing visual context according to an example of embodiment of the present invention.

FIG. 7 is a diagram synoptically illustrating a device for recognizing visual context according to an example of embodiment of the present invention.

A classification device according to the present invention may be implemented by dedicated calculation means, or via software instructions executed by a microprocessor connected to a data memory. For the sake of clarity of the disclosure, the example illustrated in FIG. 7 describes the classification device in a non-restrictive way in terms of software modules, assuming that some modules described may be subdivided into several modules, or grouped together.

The classification device 70 receives as input a multimedia object I in digital form, e.g. input by input means arranged upstream, not represented in the figure. A microprocessor 700 connected to a data memory 702 enables the implementation of software modules the software instructions whereof are stored in the data memory 702 or a dedicated memory. The images, textual tags or other objects according to determined modalities and the descriptors may be stored in a memory 704 forming a database.

The classification device may be configured for implementing a classification method according to one of the embodiments described.

The implementation of a classification method may be achieved by means of a computer program comprising instructions provided for this purpose. The computer program may be recorded on a storage medium readable by a processor.

The invention claimed is:

1. A method for classifying a multimodal test object, termed a multimedia test object, described according to at least one first modality and one second modality, said method comprising:
    constructing a recoding matrix X of representatives of the first modality forming a dictionary of the first modality including a plurality $K^T$ of words of the first modality, wherein each of the components of the recoding matrix X forms information representative of the frequency of each word of the second modality of a dictionary of the second modality including a plurality $K^v$ of words of the second modality, for each word of the first modality,
    an offline construction, by unsupervised classification, of a multimedia dictionary $W^m$, defined by a plurality $K^m$ of multimedia words, on the basis of the recoding matrix X,
    a classification of a multimedia test object comprising:
        recoding of each representative of the first modality, relating to the multimedia test object, on the multimedia dictionary $W^m$ base, and
        aggregating the representatives of the first modality coded in the recoding step in a single vector BoMW representative of the multimedia test object.

2. The method of classification of claim 1, wherein constructing the recoding matrix X comprises:
    constructing a word occurrence matrix for the second modality on a plurality of N images,
    constructing an intermediate matrix including $K^T$ columns, each column corresponding to a word of the first modality, said intermediate matrix containing, for each image in the plurality N, information representative of the presence or absence of each word of the second modality,
    constructing, from the occurrence matrix and the intermediate matrix, the recoding matrix X which contains for each word of the first modality and each word of the second modality an aggregation on the plurality of N images of the occurrence of the word of the second modality for the word of the first modality.

3. The method of classification of claim 1, wherein said first modality is textual, and said second modality is visual, the test object being a test image associated with textual tags, said dictionary according to the first modality being a textual dictionary $W^T$ and said dictionary according to the second modality being a visual dictionary $W^v$.

4. The method of classification of claim 3, comprising a sequence of at least the following steps performed offline:
    extracting the visual features of a plurality N of images forming a learning base, during which the local features of each image are extracted and coded on the visual dictionary $W^v$;
    constructing the recoding matrix X;
    normalizing the recoding matrix X;
    performing an unsupervised classification step, referred to as a step of clustering the normalized recoding matrix, for generating the multimedia dictionary $W^m$.

5. The method of classification of claim 3, comprising a sequence of at least the following steps performed online:
    recoding of each textual tag of the test image on the multimedia dictionary, $W^m$, for generating a recoded matrix Z;
    aggregating the recoded matrix Z and generating a multimedia signature BoMW for the test image.

6. The method of classification of claim 1, wherein recoding is based on a locally constrained linear coding technique.

7. The method of classification of claim 4, wherein said normalizing the recoding matrix comprises a row-wise normalization of the recoding matrix X according to the L1-norm.

8. The classification method of claim 4, wherein said step of clustering is performed based on a K-means algorithm.

9. A device for classifying a test object comprising a microprocessor and a data memory for implementing a method for classifying a multimodal test object, termed a multimedia test object, described according to at least one first modality and one second modality, said method comprising:
    constructing a recoding matrix X of representatives of the first modality forming a dictionary of the first modality including a plurality $K^T$ of words of the first modality, wherein each of the components of the recoding matrix X forms information representative of the frequency of each word of the second modality of a dictionary of the second modality including a plurality $K^v$ of words of the second modality, for each word of the first modality,
    an offline construction, by unsupervised classification, of a multimedia dictionary $W^m$, defined by a plurality $K^m$ of multimedia words, on the basis of the recoding matrix X,
    a classification of a multimedia test object comprising:
        recoding of each representative of the first modality, relating to the multimedia test object, on the multimedia dictionary $W^m$ base,
        aggregating the representatives of the first modality coded in the recoding step in a single vector BoMW representative of the multimedia test object.

10. A computer program comprising instructions stored on a tangible non-transitory storage medium for executing, on a processor, a method for classifying a multimodal test object, termed a multimedia test object, described according to at least one first modality and one second modality, said method comprising:
    constructing a recoding matrix X of representatives of the first modality forming a dictionary of the first modality including a plurality $K^T$ of words of the first modality, wherein each of the components of the recoding matrix X forms information representative of the frequency of each word of the second modality of a dictionary of the second modality including a plurality $K^v$ of words of the second modality, for each word of the first modality, an offline construction, by unsupervised classification, of a multimedia dictionary $W^m$, defined by a plurality $K^m$ of multimedia words, on the basis of the recoding matrix X, a classification of a multimedia test object comprising:
recoding of each representative of the first modality, relating to the multimedia test object, on the multimedia dictionary $W^m$ base,
aggregating the representatives of the first modality coded in the recoding step in a single vector BoMW representative of the multimedia test object.

11. A tangible non-transitory processor-readable recording medium on which a program is recorded comprising instructions for executing a method for classifying a multimodal test object, termed a multimedia test object, described according to at least one first modality and one second modality, said method comprising:

constructing a recoding matrix X of representatives of the first modality forming a dictionary of the first modality including a plurality $K^T$ of words of the first modality, wherein each of the components of the recoding matrix X forms information representative of the frequency of each word of the second modality of a dictionary of the second modality including a plurality $K^v$ of words of the second modality, for each word of the first modality, an offline construction, by unsupervised classification, of a multimedia dictionary $W^m$, defined by a plurality $K^m$ of multimedia words, on the basis of the recoding matrix X, a classification of a multimedia test object comprising:
recoding of each representative of the first modality, relating to the multimedia test object, on the multimedia dictionary $W^m$ base,
aggregating the representatives of the first modality coded in the recoding step in a single vector BoMW representative of the multimedia test object.

* * * * *